United States Patent [19]

Broyden et al.

[11] Patent Number: 4,636,962

[45] Date of Patent: Jan. 13, 1987

[54] MICROPROCESSOR-CONTROLLED HOIST SYSTEM

[75] Inventors: Robert H. Broyden, Williamsville; Douglas E. Schenk, Tonawanda; Raymond A. Newman, Cheektowaga, all of N.Y.

[73] Assignee: Columbus McKinnon Corporation, Amherst, N.Y.

[21] Appl. No.: 497,723

[22] Filed: May 24, 1983

[51] Int. Cl.[4] .......................... G06F 15/20; B66D 1/48

[52] U.S. Cl. .................................... 364/478; 212/149; 254/276; 254/362; 318/468

[58] Field of Search ........................ 364/468, 478, 505; 187/29 R; 340/19 R, 21, 685, 686; 212/149, 152, 153; 254/264, 266, 267–269, 273–276, 362; 318/471, 480, 466–469, 472, 473; 414/592, 560, 564, 569

[56] References Cited

U.S. PATENT DOCUMENTS

| | | | |
|---|---|---|---|
| 3,053,344 | 9/1962 | Buck | 254/276 X |
| 3,425,515 | 2/1969 | McDonald et al. | 187/29 R |
| 3,497,787 | 2/1970 | Fuelster et al. | 254/362 X |
| 3,773,146 | 11/1973 | Dixon, Jr. et al. | 187/29 R |
| 3,863,772 | 2/1975 | Schwartz | 212/153 |
| 4,061,949 | 12/1977 | Griffis | 318/471 X |
| 4,087,078 | 5/1978 | Joraku et al. | 254/362 |
| 4,139,891 | 2/1979 | Sheldon et al. | 364/567 |
| 4,216,868 | 8/1980 | Geppert | 212/155 |
| 4,221,996 | 9/1980 | Shimuzu et al. | 318/480 X |
| 4,323,222 | 4/1982 | Dempster et al. | 254/274 |
| 4,334,217 | 6/1982 | Nield et al. | 212/153 X |
| 4,361,312 | 11/1982 | Schreyer et al. | 254/276 |
| 4,367,811 | 1/1983 | Yoneda et al. | 187/29 |
| 4,368,518 | 1/1983 | Terazono et al. | 187/29 X |
| 4,434,971 | 3/1984 | Cordrey | 254/273 |
| 4,487,741 | 12/1984 | Vuckovich et al. | 212/149 X |
| 4,537,029 | 8/1985 | Gunda et al. | 91/363 R |

*Primary Examiner*—Joseph Ruggiero
*Attorney, Agent, or Firm*—Bean, Kauffman & Bean

[57] ABSTRACT

Load position limits and incremental lowering of a load are controlled by a microprocessor forming an interface between an operator's control station and the hoist. Other hoist status conditions such as underspeed and overspeed of the hoist motor are detected by the microprocessor based upon hoist speed during the position limit setting cycle. Still other hoist status data such a motor overheating, number of power-up cycles, number of under and overspeed shut-downs, number of power failures, etc. are input to the microprocessor and all such data as up-dated are entered into a non-volatile memory which, when extracted, permits maintenance scheduling.

33 Claims, 7 Drawing Figures

MICROPROCESSOR-CONTROLLED HOIST SYSTEM

BACKGROUND OF THE INVENTION

Load handling hoist systems which utilize electric motors to raise and lower a load are used in a wide variety of industrial applications and, consequently, they are operated often under circumstances which are extremely hostile to longevity of the hoist systems. For this and other reasons, such hoists are normally provided with safety switches such as a limit switch which is mechanically actuated when the hoist hook or load engaging hook reaches substantially the upper limit of its travel. Operation of the switch, if it occurs, prevents the hoist operator from raising the load beyond the limit and thereby is intended to prevent damage to the hoist. Such electro-mechanical devices however are propense to maladjustment or failure.

Another problem which faces operators of industrial hoists is encountered when a large workpiece is to be actively positioned with respect to a piece of equipment such as a lathe or other metal forming tool.

In such circumstances, it is desirable to lower the load gently from an elevated, suspended position to a final position. This type of maneuver has proven difficult to accomplish. In an attempt to solve this positioning problem, a variety of approaches have been used as for example in the following U.S. Pat. Nos.: 3,730,484, 2,752,120, 2,801,760.

To solve the problem associated with "jogging" the load to final position a precise load positioner is disclosed in U.S. Pat. No. 4,361,312 of Nov. 30, 1982, assigned in common herewith. This patent is directed to apparatus which may be retrofit in a single speed or dual speed hoists, the device being provided to modify a standard hoist in order to enable that hoist to position a suspended load very precisely. The patented device operates by temporarily causing the hoist brake to be released for a predetermined limited period without actuating the hoist motor so that the load is lowered through a small incremental distance under the influence of its own weight.

Inter alia, the aforesaid commonly assigned patent discloses a system in which a gear tooth detector is utilized to monitor the pinion gear of the hoist motor to generate a digital pulse corresponding to the passage of each of the teeth of the gear as it passes the location of the transducer. The pulse signal is then delivered to a digital counter which has been preset to count the pulses from the transducer when the brake release lowering operation is effected. When the total number of pulses thus received from the transducer equals the predetermined number of pulses selected by the operator and dialed into the digital counter/comparator, the counter/comparator terminates the brake release control signal thereby allowing the brake to reengage so as to halt load descent. Thus, in this particular embodiment of the patent, the control signal from the precise load positioner is dependent upon load movement rather than upon time, other embodiments of the patented device being effective to interrupt the brake release control signal after a predetermined period of time.

Other patents of which applicants were aware at the time of filing this application are as follows:

| | |
|---|---|
| Santini et al | 2,403,125 |
| Crookston | 2,656,027 |
| Bogle | 2,752,120 |
| Logan | 2,912,224 |
| Buck | 3,053,344 |
| Ancheta | 3,883,859 |
| Joraku et al | 4,087,078 |
| Australian | 283,230 (10/1965) |
| U.K. | 826133 (12/1959) |

BRIEF SUMMARY OF THE INVENTION

The present invention is, generally speaking, directed to microprocessor control for hoist systems. Principal features of the invention are as follows:

1. Travel Limits 1.1 To be set from control station by pressing a sequence of buttons.

1.2 The design is such that either limit can be set or reset independent of the other limit.

2. Multiple Speed Control 2.1 For use with multiple speed hoists.

2.2 An input at the control station is interpreted by the microprocessor so that the latter outputs a signal that will change the speed of the motor.

3. Single Phase State Control 3.1 For use on hoist devices with single phase electric motor as the prime mover.

3.2 At a predetermined speed, this function causes the start winding of the electric motor to open circuit.

3.3. The predetermined speed is determined by comparing a predetermined time value of the dwell period of a Hall effect transducer signal.

4. Reverse Operation Delay 4.1 This function provides a time delay when changing between directions of hoist travel. This allows the prime mover to stop before attempting to run in the opposite direction.

5. Creep Function 5.1 The brake is released for a predetermined incremental amount of load movement and the brake mechanism is then allowed to re-apply for a predetermined period of time.

5.2 Step 5.1 is repeated for as long as the creep input is continued.

5.3 The predetermined incremental travel of a load is sensed by the Hall effect switch.

6. Overtemperature Shut-Off 6.1 For use on a hoist system when operating in the lifting direction.

6.2 Disables a lifting direction movement when a predetermined motor temperature is reached.

7. Over/Under Speed and Overload Shut-Off 7.1 Overspeed and underspeed limits are predetermined values, specified as percentages of nominal speed.

7.2 Nominal speed is determined during the travel limit setting procedure by recording the Hall effect switch dwell time.

8. Misphase Correction 8.1 For use on polyphase prime movers.
8.2 Will energize the prime mover such that it will run in the desired direction.
8.3 The incoming power phasing sequence is sensed and the prime mover is then logically actuated.

9. Data Retention 9.1 During power interruption the following data is stored in a non-volatile memory:
9.1.1 Limits.
9.1.2 Number of motor starts.
9.1.3 Motor run time.
9.1.4 Overtemperature shut downs.
9.1.5 Number of brake actuations.
9.1.6 Total number of over/under speed shut down.
9.1.7 Number of times power is off.
9.1.8 Number of times limits are reset.
9.1.9 Load position.
9.2 The retained data can be extracted by means of an interrogation port on the microprocessor to provide service diagnosis and allow maintenance to be scheduled.

BRIEF DESCRIPTION OF THE DRAWING FIGURES

DETAILED DESCRIPTION OF THE INVENTION

Figure 1:
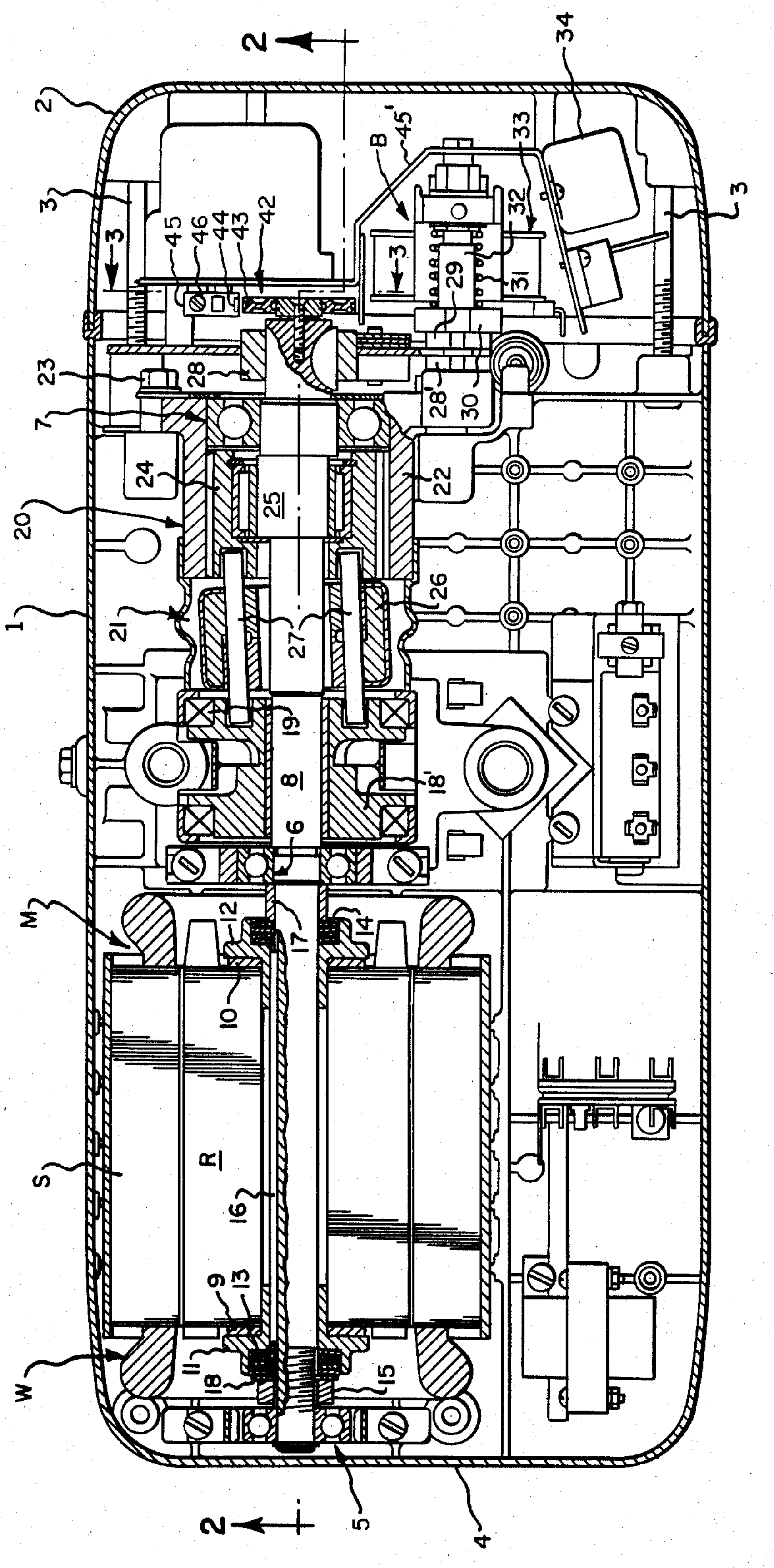
FIG. 1 is a horizontal section taken through a hoist mechanism and illustrating certain features of the present invention.

FIGS. 1–5 are illustrative of mechanical details of a hoist structure with which the present system is associated.

The hoist structure includes a frame 1 having a removable end cover 2 secured to the frame by suitable fasteners such as are indicated at 3. In one end of the main frame is provided an electric motor indicated generally by the reference character M. This motor includes the stator S and its associated windings W and the rotor R. The end section 4 of the frame 1 mounts the bearing indicated generally by the reference character 5, an intermediate portion of the frame mounts a second bearing 6, and a third bearing 7 is mounted at the opposite end of the frame 1 near the end cover portion 2. These bearings are disposed in coaxial relationship and journal the main drive shaft 8 of the hoist assembly. This shaft is coupled to the rotor R through a preloaded clutch assembly which includes the two clutch linings or discs 9 and 10, their respective clutch pressure plate elements 11 and 12, the Belleville spring packs 13 and 14 and the preloading nut 15. The details of the preloaded clutch assembly form, per se, no part of the present invention. However, for a proper understanding it will be seen that the two pressure plate portions 11 and 12 are keyed to the drive shaft 8 by the suitable key indicated by the reference character 16, for example, or they may be splined thereon as desired. The Belleville spring pack 14 seats upon the spacer 17 and the Bellevile spring pack 13 is seated upon the nut lock washer 18 and the nut 15 is threaded on the shaft 8 to preload the spring pack 13 and 14 whereafter a tab of the washer 18 or tabs thereof are bent over to hold this position of the nut 15. The rotor R is journalled on the hub portions of the pressure plates 11 and 12 and it will be appreciated that dependent upon the preloading of the spring packs 13 and 14, the rotor R and the members 11 and 12 which are keyed to the shaft 8 will turn in unison unless the resistance to rotation of the shaft 8 indicative of an overloading condition of the hoist occurs in which case slippage will occur between the clutch components and the rotation of the shaft 8 will correspondingly slow down.

The chain drive sprocket or liftwheel 18' is journalled to the frame through roller bearing 19 and this liftwheel 18' has the chain C looped thereover, to one end of which is attached the load hook H and the opposite end of the chain being anchored to the frame assembly 1. This is a conventional configuration.

The liftwheel 18' is driven rotationally at a reduced speed with respect to the rotation of the shaft 8 as effected by the gear reduction unit 20 and the coupling unit indicated generally by the reference character 21. In the form of the hoist shown, the gear reduction unit 20 comprises the internal gear 22 which is fixed to the frame 1 as by the fasteners 23 and the external gear 24 which is journalled upon the eccentric portion 25 of the drive shaft 8 to orbit within the internal gear 22 in mesh therewith to effect a significantly large gear reduction as is inherent in this type of drive. The coupling unit 21 comprises the body 26 having the coupling pins 27, the opposite ends of which are loosely fitted in the pockets of the liftwheel 18' and the external gear 24 substantially as is shown in both FIGS. 1 and 2.

One end of the drive shaft 8 is provided with a brake disc 27, the hub 28 of which is keyed or splined to the shaft 8 and the frame 1 carries the brake assembly indicated generally by the reference character B which includes the brake pads 28' and 29, the brake pressure plate 30 which is normally urged by the spring 31 to engage the brake and which has associated with it an armature 32 which, under the influence of the solenoid winding 33 serves to oppose the spring 31 and release the brake, all as is conventional. They relay for the armature winding 33 is indicated by the reference character 34.

Figure 3:
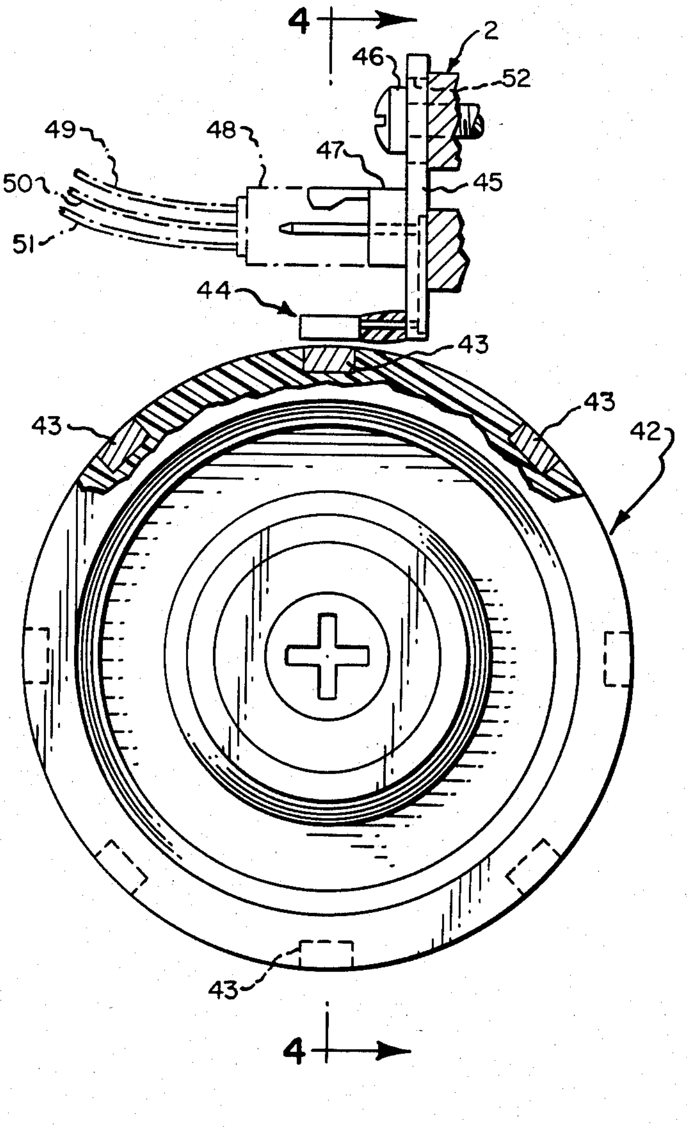
FIG. 3 is an end view, partly broken away showing the Hall effect switch system.
Figure 4:
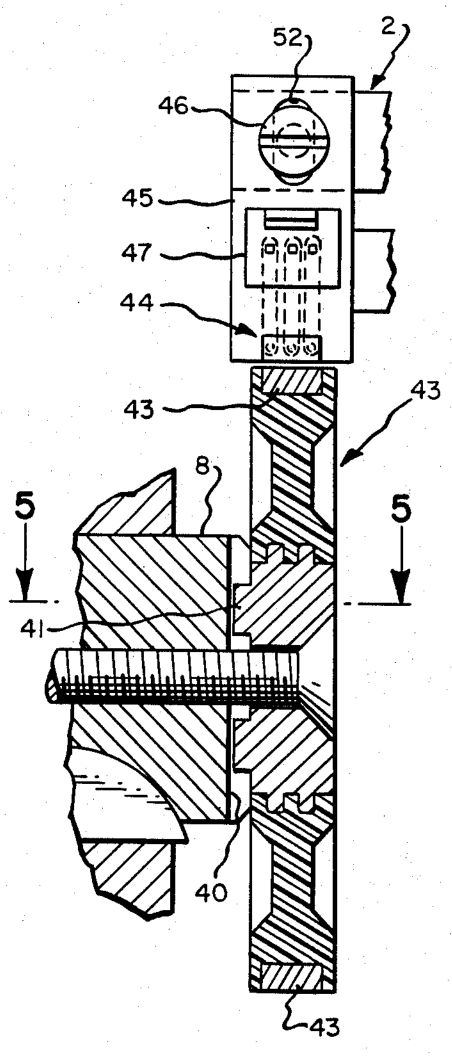
FIG. 4 is a section taken along section 4—4 in FIG. 3 showing further details of the switch mechanism.
Figure 5:
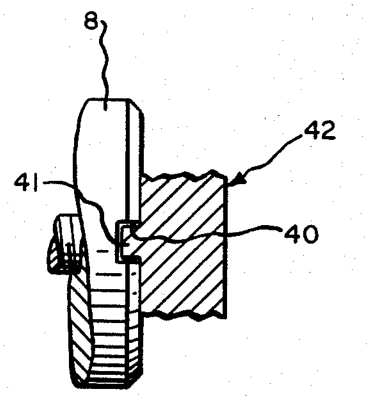
FIG. 5 is a horizontal section taken substantially along the plane of section line 5—5 in FIG. 4 but showing further details.

As is shown in FIGS. 3–5, one end of the shaft 8 is slotted as at 40 to receive the projections 41 of the magnetic rotor indicated generally by the reference character 42 which carries, around its periphery, a series of eight equally spaced magnetic elements 43. The Hall effect transducer is indicated generally by the reference character 44 in FIG. 3 and a dielectric mounting element 45 is secured to the contactor bracket 45' by means of a fastener 46 and includes a male plug base 47 by means of which the female connector 48 establishes electrical connection between electrodes of the device 44 and the conductors 49, 50 and 51. As is shown in FIG. 4, the fastening element 46 passes through a slot 52 in the element 45 so as to allow the adjustment of a proper gap between the element 44 and the magnetic elements 43, as is shown in FIG. 4.

The end cover portion 2 of the frame assembly houses various electrical relays as will be presently apparent.

Figure 2:
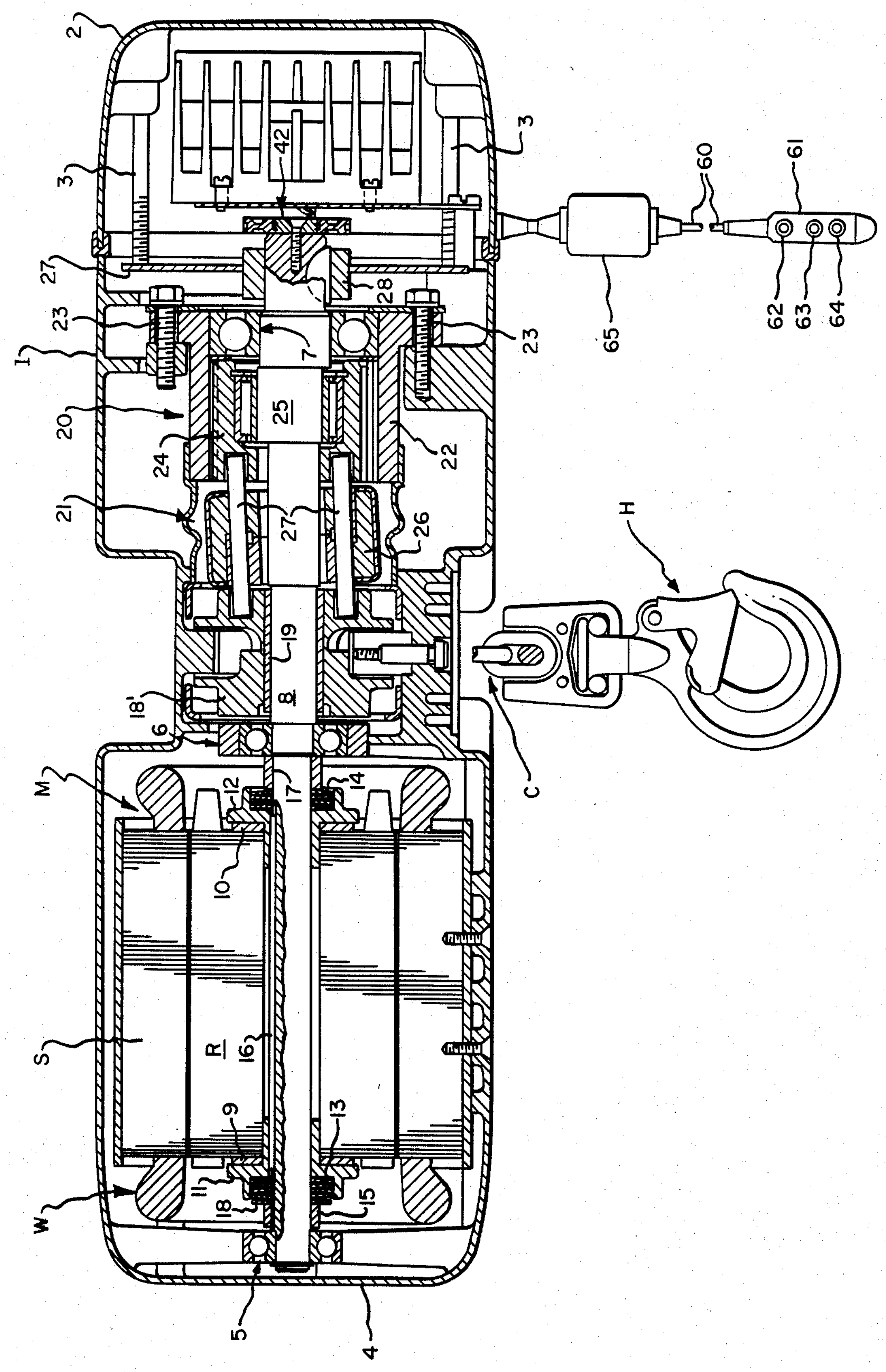
FIG. 2 is a vertical section taken through the hoist taken generally along the plane of Section line 2—2 in FIG. 1.

Suitable power connections are made to the hoist assembly shown in FIGS. 1 and 2, same not being shown because they are explained in conjunction with FIGS. *6a* and *6b*, but FIG. 2 does show the pendant assembly in the form of a flexible multiwire conductor 60 of suitable length to allow an operator to move freely about when operating the hoist. The lower end of the conductor 60 carries the pendant control station 61 which is sufficiently small as to be grasped manually by the operator and carried about. The control station 61 includes the three switch buttons 62, 63 and 64 as shown and the conductor 60 also carries a housing 65 within which the circuitry shown in FIGS. *6a* and *6b* is, for the most part, contained.

Before proceeding to the description of FIGS. *6a* and *6b*, it is well to state at this point certain of the physical operations at the pendant control 61 which effects some of the hoist functions. As noted earlier, the operator's control 61 includes the three pushbutton devices 62, 63 and 64. 62 is one position, 63 and 64 are of the two-position type. That is, if a pushbutton is depressed to a first position, a switch (later described) is actuated whereas if it is depressed further to a second position, a further switch is closed. The pushbutton 62, in its only actuated position, closes a "creep" switch which, in effect, initiates intermittent brake release.

The second pushbutton 63, in its first position, will cause the hoist to operate in the load raising direction at normal speed by closing an appropriate "up" switch whereas in its second position, it will cause the hoist speed to change. Similarly, the pushbutton 64 will cause the hoist to operate in the load lowering direction at normal speed when depressed to its first position (closing the "down" switch) and will change the motor-driven lowering speed when depressed to its second position.

For setting a position limit of the hoist, two pushbuttons must be depressed at the same time. For example, to set an upper position limit, the pushbutton 62 should be depressed and the "up" button 63 should be depressed to its second position. On single speed hoists, the necessary and sufficient condition is that the operator commands "creep"+"up"+"fast". Then, when this command is terminated, the upper position limit is set corresponding to the position of the load hook at that time. On two speed hoists, the necessary and sufficient condition is that the operator commands "creep"+"up"+"fast" then changes to "creep"+"up" by releasing on the up button slightly to open the fast switch. This enables the processor to record both speeds of the motor for the read over/under speed operation. In similar fashion, the lower position limit is set by manipulating both buttons 62 and 64.

It should be noted at this point that not all hoists will have provision for "normal" and "fast" speeds. In such cases, only the "normal" speed is provided for. However, the above commands for position limit setting are still used. In other words, the circuitry described below is the same regardless of the type of hoist. This also applies for single vs three phase hoist motors.

In FIG. *6a*, "fast", "creep", "up" and "down" instruction data generated under control of the operator's control station are provided as inputs to the microprocessor 70 at the lines 71, 72, 73 and 74 respectively. The microprocessor 70 is a type 8049 and the input lines 71–74 are to the respective pins 31, 30, 29 and 28 thereof. The operator's control pendant switches corresponding to "fast", "creep", "up" and "down" are indicated at 75, 76, 77 and 78 respectively. These switches are connected in series with the respective diodes 80, 79, 81 and 82 to the common conductor 83 which is an electrical connection with one end of the secondary winding 84 of the transformer T, the primary winding 85 of which is connected to line voltage AC source.

Thus, during negative half cycles with the "creep" switch closed, current flows through the diode 79, the switch 76, the infrared emitting diode 91 of the optical isolator 92 and back to the then-positive end of the secondary winding 84 over the conductors 88 and 89. Thus, the isolator 92 draws current through the resistor 93 storing it to a low level via capacitor 106 to trigger the Schmitt trigger circuit 94 to a high level output to the input line 72 so long as the switch 76 remains closed.

When the "fast" switch 75 is closed, current flows during the positive half cycles through the diode 80, the switch 75, the emitting diode 86 of the optical isolator 87 and back through the lines 88 and 89 to the then-negative end of the secondary winding 84. Conduction by the isolator 87 draws current through the resistor 90 storing it to a low level via capacitor 105 to fire the Schmitt trigger 91 to a high level output to the input line 71 during the aforesaid positive half cycles so long as the switch 75 remains closed.

Similarly, when the "up" switch 77 is closed, during positive half cycles current flows through the diode 81 to the emitting diode 95 of the optical isolator 96 and back over the lines 88 and 89 to the other end of the secondary winding 84. The optical isolator 96 draws current through the resistor 97 storing it to a low level via capacitor 107 to trigger the Schmitt trigger circuit 98 to a high level output to the input line 73 to the microprocessor 70 so long as the switch 77 remains closed.

During negative half cycles, when the switch 78 is closed, current flows through the diode 82, the switch 78, the emitting diode 99 of the optical isolator 100 and back to the positive side of the secondary winding 84 over lines 88 and 89. Conduction by the isolator 100 causes current to flow through the resistor 101 storing it to a low level via capacitor 108 to trigger the Schmitt circuit 102 to a high level output to the input line 74 during negative half cycles so long as the switch 78 remains closed.

The resistors 103 and 104 are provided for current limiting and the capacitors 105, 106, 107 and 108 operate in conjunction with their corresponding resistors 90, 93, 97 and 101 as low pass filters to eliminate spurious signals to the various Schmitt trigger circuits.

Switch 76 is actuated by the pendant button 62 of FIG. 2. The switch 77 is associated with the button 63 of FIG. 2, such switch being closed in the first position of the button 63. The switch 78 is associated with the buttom 64 of FIG. 2 and, likewise, the switch 78 is closed in the first position of the button 64. In addition, the two buttons 63 and 64, although not shown in FIG. *6a* for the purpose of clarity, additionally close the switch 75 in the second positions of these buttons 63 and 64. The required operation will be evident from the following description:

For "up" operation of the hoist at normal speed, the button 63 is depressed to its first condition or position which closes the switch 77 and a high output is generated by the Schmitt trigger 98 at the input line 73 to the microprocessor 70. No inputs are present at the lines 71, 72 and 74. If, now, the switch 63 is depressed to its second position, the high output of Schmitt trigger 94 is to the input at line 71, signalling that the operator desires "up" and "fast" operation of the hoist. Similarly, if the button 64 is depressed to its first position, an output thereof is generated at the line 74 and the other lines 71, 72 and 73 are quiescent. Depression of the button 64 to its second position adds the high output at the line 71. For the "creep" function, the button 62 is depressed which closes the swich 76 and produces a high output at the line 72 from the Schmitt trigger 94 caused by negative half cycles. Thus, the signal at line 72 is in reality a "brake release" command signal but it is to be understood that the brake mechanism of the hoist for self-lowering is not energized in response to every input pulse at the line 72 but that the microprocessor 70 is programmed, in the presence of this signal, to generate the requisite brake release command signals as is described hereinafter. One further function should be described at this time and that is the position limit setting of the system. In connection with this, the microprocessor 70 is so programmed as to inhibit normal hoist operation unless the load limits have been set. As delivered from the factory, the microprocessor 70 has already been input with position limit information but if the operator desires to change those limits, he must simultaneously operate not only the pushbutton 62 but also one of the other two pushbuttons 63 or 64, dependent upon whether he wishes to set an "up" limit or a "down" limit. This is accomplished in the fashion next described. The microprocessor 70 is programmed to set a position limit only if signals simultaneously appear on the two lines 71 and 72 and one or the other of the lines 73 and 74. Thus, for an operator to set an "up" limit, he must depress the button 62 whereby the switch 76 is closed and he also depresses the button 63 to its fully depressed position whereby the switches 75 and 77 are closed. This will operate the hoist upwardly until the operator terminates the action by releasing the button 63, whereupon the microprocessor 70 recognizes this as the new "up" limit position. A similar operation with the buttons 62 and 64 will establish the "down" limit position. After these limit positions have been set, the hoist can be operated in a normal fashion. It should be noted that even if the hoist has no provision for "fast" speed, it is still necessary to depress the button 63 or 64 to its second position in order to establish limit positions. It should also be noted at this point that the microprocessor 70 is programmed to measure the hoist speed during the position limit cycling as a calibration speed against which overspeed and under-speed functions hereinafter described are assessed.

Figure 6A:
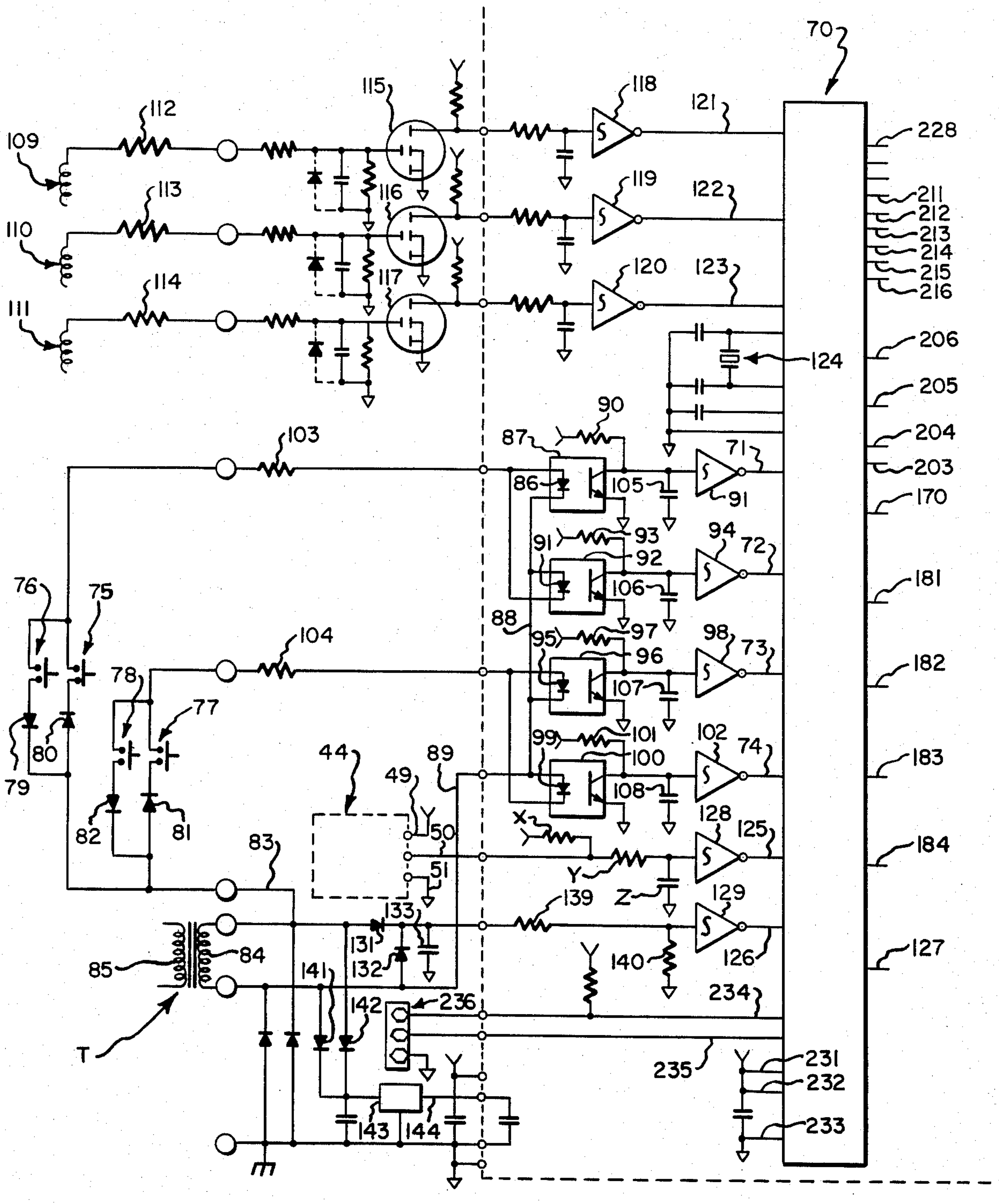
FIGS. 6*a* and 6*b* are circuit diagrams illustrating one embodiment of the invention.

The microprocessor 70 is also provided with input data concerning three phase motor connections. The three phases of power supply of FIG. 6*a* are indicated by the reference characters 109, 110 and 111 and the three phase connections to these windings may be effected in any combination because of the microprocessor input data information now to be described. The three windings 109, 110 and 111 are connected through the respective current limiting resistors 112, 113 and 114 to the gates of the respective devices 115, 116 and 117. The respective devices 115, 116 and 117 respectively trigger the Schmitt circuits 118, 119 and 120 so that the trains of input pulses at lines 121, 122 and 123 are in phase with the respective phases connected to the windings 109, 110 and 111. The phase intelligence thus present at the lines 121, 122 and 123 allow the microprocessor 70 to control the "up" and "down" instruction from the pendant to effect the proper direction of the rotation of the motor. If a single phase hoist motor is used, the connections are not used and the normal "up" and "down" motor control relays as hereinafter described are instructed directly from the pendant.

The six Schmitt triggers 118–120 and 91, 94 and 98 are part of a type 40106 hex Schmitt trigger integrated circuit whereas the circuit 102 and the five remaining yet to be described form another type 40106 integrated circuit. The input lines 121, 122 and 123 are to pins 34, 33 and 32 respectively of the microprocessor 70.

The transistors 115, 116 and 117 are type VN10KM. The crystal 124 is a 5 mHz crystal.

Three more input lines are provided to the microprocessor 70, and are indicated respectively at 125, 126 and 127. The two lines 125 and 126 are from the Schmitt circuits 128 and 129 shown in FIG. 6*a* whereas the input at line 127 is from the Schmitt circuit 130 shown in FIG. 6*b*.

Concerning the input at the line 125, the Hall effect transducer 44 is of the bipolar type and it triggers the Schmitt trigger 128 every time a magnetic insert 43 passes beneath the transducer 44 (FIG. 3) at a frequency which is four times that of the rotational speed of the motor shaft 8. As noted earlier, during position limit cycling, the microprocessor 70 uses the period of these pulses as a calibration speed against which normal operating speeds of the hoist later are compared to determine whether there is an overspeed or an underspeed condition existing. The components X, Y and Z form a low pass filter for the Hall effect sensor output.

The Schmitt trigger 129 produces an output pulse at the line 126 only at "power off". As will be seen, the two diodes 131 and 132 permit the capacitor 133 to be charged during both positive and negative half cycles of a line source so that at any time when the source is connected to the transformer T, the capacitor 133 will remain in a high state and will trigger the circuit 129 to produce a "power off" pulse at the line 126 only when the voltage on the capacitor 133 is drained to that value, through the resistors 139 and 140, which triggers the circuit 129.

The transformer T also provides the source for regulated voltage supply. For this purpose, the two diodes 141 and 142 are connected to the voltage regulator 143 which provides a regulated five volt output at 144. The device 143 is a type 7805.

Figure 6B:
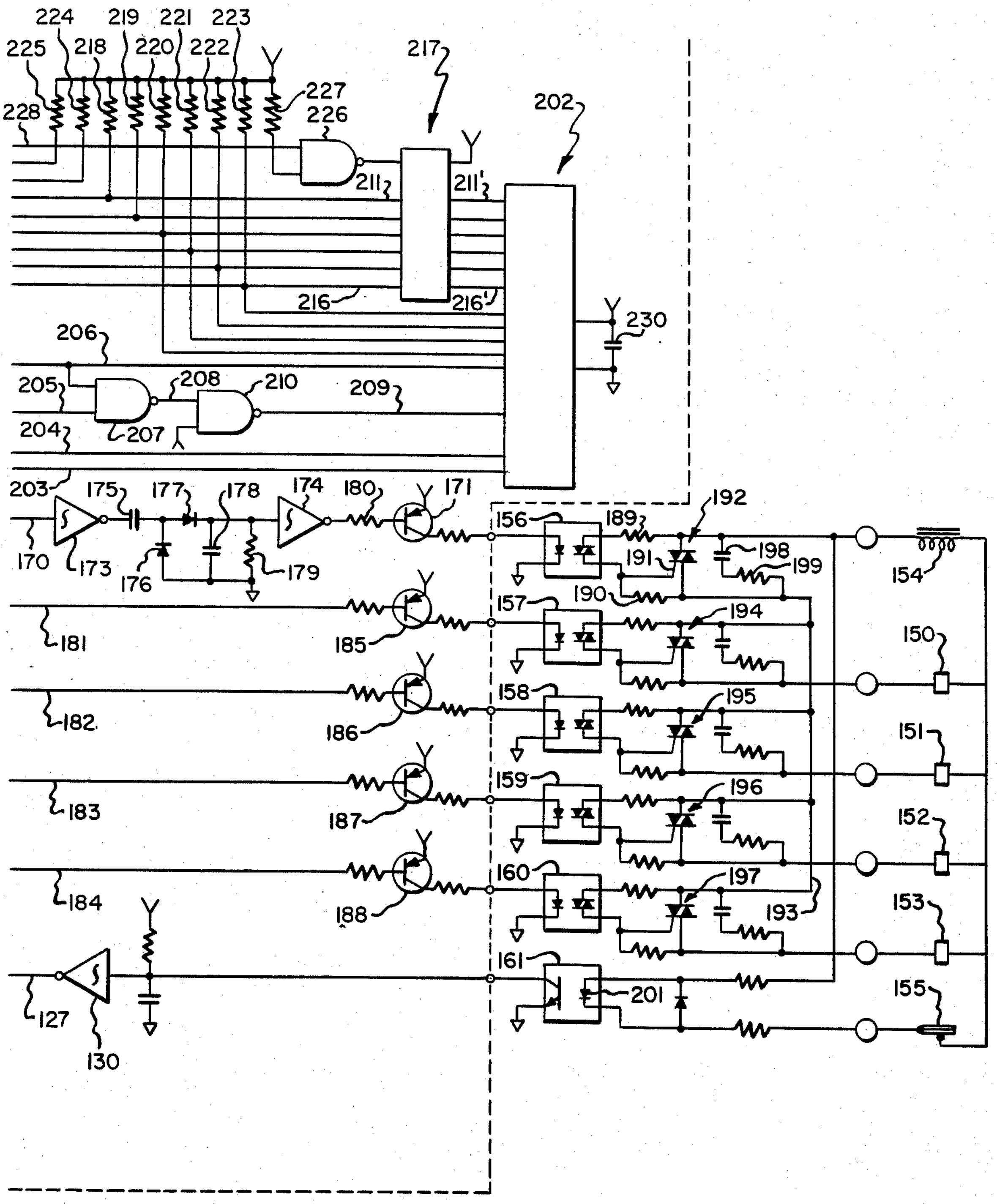

Referring to FIG. 6*b*, the "down" relay for connecting the hoist motor for operating in the downward direction is indicated by the reference character 150; the brake releasing relay is indicated by the reference character 151; the relay for operating the motor in the "fast" mode is indicated by the reference character 152 and the relay for operating the motor in the "up+ direction is indicated by the reference character 153. In addition, there is shown a second secondary winding 154 of the transformer T of FIG. 6*a* and a bimetallic switch 155 which senses motor temperature. As noted, the relay 150 operates the motor in the "down" direction whereas the relay 153 operates it in the "up" direction. This is always true for single phase motors but if a three phase motor is used, the functions of these two relays may be reversed under the control of the microprocessor 70 dependent upon the phase sequence intelligence received thereby from the lines 121, 122 and 123.

A bank of optically actuated Triacs 156–161 is associated with the elements 150–155, as will be seen. The elements 156–160 are type H11J1 and element 161 is type 4N26. As shown, one side of the secondary winding 154 is connected through the Triac 156 in parallel to all of the Triacs 157–160. Thus, no control function is possible on any of the elements 150–153 unless the Triac 156 is conducting. The purpose of this is to prevent undesired operation of any of the elements 150–153 in the case of malfunction of the the microprocessor 70. The output line 170 (pin 36) from the microprocessor 70 operates in the pulse mode when an output to the relays 150–153 is desired unless there is a malfunction or failure in the microprocessor 70. In the absence of such pulsing, the transistor 171 ceases conduction so that the infrared emitting diode 172 of the optical Triac 156 is no longer powered and the Triac 156 then reverts to its normal, open state and none of the devices 150–153 can be actuated. The two Schmitt triggers 173 and 174, the capacitor 175, diode 176, diode 177, capacitor 178 and resistor 179 together with a current limiting resistor 180 are utilized to effect this function. The operation is as follows: the pulsing input at the line 170 allows current to flow through the capacitor 175 thereby charging the capacitor 178 which charges to the threshold voltage of the Schmitt trigger 174 and causes its output to go low, thus causing the transistor 171 to conduct. Thus, the capacitor will remain charged so long as pulses appear at the output line 170, thereby maintaining the transistor 171 in a conducting state and thereby allowing the secondary winding 154 to energize any one of the devices 150–153.

The output lines 181, 182, 183 and 184 from the microprocessor 70 (corresponding to pins 24, 23, 22 and 21 thereof) are respectively connected to the transistors 185, 186, 187 and 188. If the optical Triac 156 is conducting, the voltage divider chain constituted by the resistors 189 and 190 provide the proper voltage at the control electrode 191 of the Triac 192 so that the same conducts and thus completes the circuit to the line 193 which is common to all of the further Triacs 194, 195, 196 and 197. The respective transistors 185–188 control the optical Triacs 157–160 to render the Triacs 195–197 conductive or not dependent upon the condition of the output lines 181–184. Each of the Triacs 192, 194–197 is provided with a transient snubbing circuit to prevent false triggering, which circuit is in the form of a capacitor 198 and resistor 199 such as is shown in association with the Triac 192.

The remaining input to the microprocessor 70 at the line 127 (pin 27) is provided through the bimetallic switch 155. Normally, this switch is closed so that the emitting diode 201 of the optical coupler 161 maintains a low state to the input of the Schmitt trigger 130, thereby causing a high input on the line 127. However, if the switch 155 opens due to motor overheating, the output at 127 changes to a low state. As noted earlier, hoist status data is stored in a non-volatile RAM. This device, indicated by the reference character 202, is a Xicor type X2210. The microprocessor 70 controls "recall" and "store" functions at the output lines 203 and 204 respectively (pins 37 and 38) and these connections are made to pins 10 and 9 respectively of the device 202. "Read" and "write" functions are respectively controlled at the output lines 205 and 206 (pins 8 and 10). These two output lines are applied as the inputs to a dual input NAND gate 207 so that when either of the outputs at 205 or 206 goes low, the output of the gate 207 at 208 goes high, thereby changing the normally high output state at the line 209 of the NAND gate 210 to a low state. The lines 209 and 206 are connected respectively to pins 7 and 11 of the device 202.

The output lines 211–216 of the microprocessor 70 are RAM address lines which are applied to the address latch circuit 217 which is a hex"D" flip-flop type 40174. The output lines 211–216 appear at the respective pins 17–12 of the microprocessor 70 and are applied respectively to pins 11, 14, 13, 3, 4 and 6 of the latch device 217. The lines 211–216 are normally held high by the resistors 218–223. Pins 18 and 19 of the microprocessor 70 are also normally input with positive voltage through the resistors 224, 225 respectively and one input to the NAND gate 226 is likewise held high through the resistor 227. The remaining output line (pin 11) of the microprocessor 70 is the line 228 which provides the other input to the NAND gate 226 to control the address output lines 211′–216′ which are respectively connected to pins 16, 2, 3, 4, 5 and 6 of the device 202. The capacitor 230 is connected across pins 8 and 18 of the device 202 and pins 1 and 17 thereof are not used. To complete the connections to the microprocessor 70, lines 231, 232 and 233 are connected respectively to pins 40, 26 and 20 thereof and pins 5, 9 and 25 are not used.

It will be appreciated that the microprocessor 70 is programmed to read into the memory 202 on a current status basis so that whenever power is interrupted either deliberately or by accident, the current status of the hoist is positively retained in the memory 202. The microprocessor 70 is further programmed to read out the current status from the memory 202 as soon as the power is resumed. The two remaining lines 234 and 235 of the microprocessor, corresponding to pins 1 and 21 thereof are connected to the three conductor port 236 by means of which the information in the memory 202 can be extracted serially. As noted earlier, the position limits, number of motor starts, motor run time, number of overtemperature shut-downs, number of brake actuations, total number of overspeed and underspeed shutdowns, number of times power is off, number of times the limits are reset and the actual position of the hoist load at the time of power interruption are all stored in the memory 202. This information, when extracted, allows intelligent maintenance scheduling to be effected for the hoist system.

The microprocessor is programmed such that when only the switch 76 is closed, the relay 151 will be actuated until a predetermined number of pulses appear at the line 125 whereafter the relay 151 is deenergized for a predetermined short period of time before the cycle is repeated. The program also "measures" the dwell time between pulses at the line 125 during the position limit set cycling and this dwell time is used as a speed calibration against which subsequent "overspeed" and "underspeed" determinations are made. Overspeed indicates an inadequate supply power and/or an overload in the lowering direction. Similarly, underspeed indicates an inadequate supply power and/or an overload sufficient to create clutch slip in the lifting direction. The calibration speed capability may also be used to deenergize a motor starting winding when the motor speed has come up to some predetermined percentage of the calibration speed.

It will be understood that other and different arrangements may be used as will readily occur to those of ordinary skill in the art. The invention as described hereinabove is a preferred embodiment but it is to be strictly understood that the claims hereinafter set forth are not limited to this preferred and specific embodiment but that various embodiments are intended to be covered thereby.

What is claimed is:

1. A load handling hoist system comprising:

load handling means for raising and lowering a load;

microprocessor means for generating command signals controlling the raising and lowering of a load by said load handling means in accord with a program which controls operation of the load handling means;

operator controlled means for entering instructing data into said microprocessor means to produce said command signals in accord with said program whereby the hoist system is correspondingly controlled by said microprocessor means to raise and lower a load;

sensor means for generating periodic output signals indicative of increments of raising and lowering movements of the load handling means;

said microprocessor means being programmed to identify vertical load travel limits under instruction data from said operator controlled means and to output command data when those limits are reached during subsequent operation so as to terminate load travel in correspondence with such limits; and said operator controlled means entering creep command data into said microprocessor means under control of an operator and said microprocessor means being programmed to generate time-separated load lowering command signals in response to said creep command data and said output signals from said sensor means.

2. A hoist system as defined in claim 1 including memory means connected to said microprocessor means for storing data corresponding to said command signals generated by the microprocessor means, and readout terminal means for allowing access to the data stored in said memory means whereby maintenance may be intelligently scheduled for said hoist system.

3. In a load handling hoist system, the combination of:

a reversible electric motor and actuating means for electrically connecting the motor for operation in relatively opposite directions of rotation;

load handling means driven by said motor for raising and lowering a load dependent upon the direction of rotation of said motor;

brake means for automatically braking said load handling means when said motor is not actuated;

an operator's control station including motor control means for operating said hoist through control of said actuating means, and brake release control means for effecting release of said brake means when said motor is not energized whereby to allow a load to self-lower;

sensor means associated with said motor for producing an output signal in response to each predetermined small incremental angular rotation of the motor; and microprocessor means having said sensor means output signal as an input and interfacing said control station and its control means with said actuating means and said brake whereby said brake means is automatically actuated when said actuating means is not activated, said brake means is released when said actuating means is activated and for stepwise releasing said brake means under control of said sensor means and in response to command from said brake control means under control of said sensor means and in response to command from said brake release control means.

4. In a load handling hoist system as defined in claim 3 including memory means connected to said microprocessor means for storing data identifying operation cycles of the hoist system controlled by said microprocessor means, and readout terminal means for allowing access to said data whereby maintenance may be intelligently scheduled for said hoist system.

5. In a load handling hoist system as defined in claim 3 including limit control means at said operator's station and connected to said microprocessor means for establishing position limits of a load being handled.

6. In a load handling hoist system as defined in claim 5 wherein the position limits are maximum and minimum heights of the load.

7. In a load handling hoist system as defined in claim 3 wherein said motor includes a rotor, an output shaft and a maximum torque limit clutch connecting said rotor to said output shaft, said sensor means being associated with said output shaft whereby the periodicity of said output signals while said motor is energized is indicative of the slipping and non-slipping conditions of said clutch, said microprocessor means being programmed to deenergize said motor when said clutch is slipping whereby to prevent overloading the hoist system.

8. In a load handling hoist system as defined in claim 7 including memory means connected to said microprocessor means for storing data identifying operation cycles of the hoist system controlled by said microprocessor means, and readout terminal means for allowing access to said data whereby maintenance may be intelligently scheduled for said hoist system.

9. In a load handling hoist system, microprocessor means for controlling raising, lowering and stationary holding of a load;

means, including operator controlled means, for generating operation instruction command data;

means for entering said operation instruction command data into said microprocessor means so that the microprocessor means controls raising, lowering and stationary holding of the load in response thereto;

means for generating load position data;

means for entering said load position data into said microprocessor means;

sensor means for generating periodic output signals indicative of increments of raising and lowering movements of a load;

said microprocessor means being programmed to identify vertical load travel limits under instruction data from said operator controlled means and to output command data when those limits are reached during subsequent operation so as to terminate load travel in correspondence with such limits; and said operator controlled means entering creep command data into said microprocessor means under control of an operator, and said microprocessor means being programmed to generate time-separated load lowering command signals in response to said creep command data and said output signals from said sensor means.

10. In a hoist system as defined in claim 9 wherein said means for generating operation instruction command data includes a multi-position switch means.

11. In a hoist system as defined in 9 comprising:

a motor start winding and a motor speed winding; and said raising and lowering hoist operations include commands for controlling said motor start winding.

12. In a hoist system as defined in claim 11 wherein said raising and lowering hoist operations include commands for controlling said motor speed winding.

13. In a load-handling hoist system, a hoist including prime mover means for raising and lowering a load and brake means for holding a load stationary;

an operator's station including control means for generating instruction data to effect hoist operation; and microprocessor means interfacing said operator's station with said hoist and responsive to said instruction data for controlling raising and lowering of the hoist, for establishing upper and lower position limits of the hoist and for intermittently releasing said brake means to allow a load to self-lower in small incremental steps toward and to a final position.

14. In a load-handling system as defined in claim 13 wherein said microprocessor inhibits normal hoist operation until position limits are set.

15. In a load-handling system as defined in claim 14 wherein said operator's station includes a control button for "up" operation of the hoist, a control button for "down" operation of the hoist, and a control button for self-lowering the load, the microprocessor responding to simultaneous operation of the self-lowering control button and one of the "up" or "down" buttons to set position limits.

16. In a load-handling system as defined in claim 13 including a non-volatile memory means for storing hoist operation data.

17. In a load-handling system as defined in claim 14 including a non-volatile memory means for storing hoist operation data.

18. In a load-handling system as defined in claim 15 including a non-volatile memory means for storing hoist operation data.

19. In a load-handling hoist system, a hoist including a prime mover, a flexible load-suspending member adapted to be payed in and out by the prime mover, brake means for holding the flexible member stationary when the prime mover is not activated, and an operator's pendant connected to the hoist and including a first button depressable to a first position, a second button depressable to first and second positions, and a third button depressable to first and second positions, a "creep" switch actuated by said first button in said first position thereof, an "up" switch actuated by said second button in both positions thereof, a "fast" switch actuated by said second button in said second position thereof, a "down" switch actuated by said third button in both positions thereof, and a "fast" switch actuated by said third button in said second position thereof, a counting switch for providing an output signal in response to each predetermined increment of movement of said flexible member, an "up" relay for causing the prime mover to pay in the flexible member, a "down" relay for causing the prime mover to pay out the flexible member, and a "creep" relay for causing said brake means to disengage, microprocessor means connected between said switches and said relays, said microprocessor means being programmed (A) to establish upper and lower position limits respectively in response to (1) depression of said first button to its first position with said second button depressed to its second position and (2) depression of said first button to its first position with said third button depressed to its second position, (B) to actuate said "up" relay in response to depression of said second button to either of its positions, (C) to actuate said "down" relay in response to depression of said third switch to either of its positions, and (D) to delay activation of said prime mover whenever either of said second and third buttons is released.

20. In a load-handling system as defined in claim 19 wherein said microprocessor means is further programmed to inhibit operation of the hoist until said upper and lower position limits are set.

21. In a load-handling system as defined in claim 19 including means for detecting excessive temperature of the prime mover.

22. In a load-handling system as defined in claim 19 wherein said microprocessor means is further programmed to establish a calibration speed of the hoist during position limit setting and to inhibit operation of the hoist in response to either of predetermined underspeed or predetermined overspeed of the hoist during subsequent normal operation.

23. In a load-handling system as defined in claim 19 including non-volatile memory means connected to said microprocessor means for storing information defining updated hoist status which, when retrieved, allows maintenance scheduling of the hoist.

24. In a load-handling hoist system which includes a microprocessor for controlling the hoist system and an operator's pendant for providing instructions to the microprocessor, said microprocessor having four input ports which are accessed by the operator's pendant, and means controlled by the operator's pendant for providing input signals to a first two of said ports during positive half cycles of line AC and for providing input signals to the other two ports during negative half cycles of line AC, the microprocessor being programmed to set position limits for the hoist system in response to signals at said first two of said ports and one of the other two of said ports, to incrementally lower a load in response to input signals only at one of said first two ports, to raise and lower a load in response to input signals only at one and the other respectively of said other two ports.

25. A load handling hoist system comprising:

load handling means for raising and lowering a load and including an electric motor and a brake which is normally actuated;

electrically actuated control means for energizing said motor in either one of a selected relatively opposite directions of rotation and for operating said brake to release it whereby a load may be raised and lowered through indefinite distances in operating modes and may be lowered in incremental steps in a creep mode;

operator controlled means for controlling said electrically actuated means to raise and lower a load in the operating modes and to lower the load in the creep mode, said operator controlled means including microprocessor means having a plurality of inputs from which different command signals are generated which operate said electrically actuated control means to effect said operating modes and said creep mode, and a plurality of manually operated control means connected to said inputs of the microprocessor means for selecting which of said different command signals will be generated;

sensor means for generating periodic output signals indicative of increments of raising and lowering movements of the load handling means;

said microprocessor means being programmed to identify vertical load travel limits under instruction data from said operator controlled means and to output command data when those limits are reached during subsequent operation so as to terminate load travel in correspondence with such limits; and said operator controlled means entering creep command data into said microprocessor means under control of an operator and said microprocessor means being programmed to generate time-separated load lowering command signals in response to said creep command data and said output signals from said sensor means.

26. In a load-handling hoist system, the combination of a hoist having a reversible electric motor and a normally actuated brake; an operator's station including three control switch means for respectively generating hoist up signals, hoist down signals and incremental hoist lowering signals; and microprocessor means interfaced between said control switch means and said hoist for converting said hoist up signals into commands to operate said motor in one direction of operation while releasing said brake, to convert said hoist down signals into commands to operate said motor in the opposite direction of rotation while releasing said brake, to convert said incremental lowering signals into intermittent commands to release said brake, and to convert a combination of said incremental lowering signals and one of the hoist up and hoist down signals into an internal command to set load limit positions.

27. In a load-handling hoist system as defined in claim 26 wherein said microprocessor means is programmed to prevent normal operation of the hoist until load limit positions are set.

28. In a load-handling hoist system as defined in claim 27 wherein said microprocessor means is programmed to determine calibration speed of the hoist during load limit positioning and to inhibit operation of the hoist in response to either of predetermined overspeed or predetermined underspeed of the hoist during subsequent operation of the hoist.

29. In a load-handling hoist system, the combination of a hoist having a reversible electric motor and brake means for normally holding a load stationary when the motor is not energized; an operator's station comprising a pendant having individual control means for respectively commanding said motor to raise a load, for commanding said motor to lower a load, and for initiating a sequence of brake means release operations to lower a load in incremental steps; and microprocessor means responsive to operation of said individual control means for effecting energization of said motor to raise a load, for effecting energization of said motor to lower a load, and for effecting intermittent release of said brake means to lower a load in said incremental steps.

30. In a load-handling hoist system as defined in claim 29 wherein said microprocessor means is programmed to set an upper load position in response to simultaneous operation of said control means which respectively command said motor to raise a load and initiate a sequence of brake release operations and to set a lower load position in response to simultaneous operation of said control means which respectively command said motor to lower a load and initiate a sequence of brake release operations.

31. In a load-handling hoist system as defined in claim 30 wherein said microprocessor means is programmed to prevent raising and lowering of a load until said upper and lower load position limits are set.

32. In a load-handling hoist system as defined in claim 31 wherein said microprocessor means is programmed to determine calibration speed of the hoist during load limit positioning and to inhibit operation of the hoist in response to either of predetermined overspeed or predetermined underspeed of the hoist during subsequent operation of the hoist.

33. In a load-handling hoist system as defined in claim 30 wherein said microprocessor means is programmed to determine calibration speed of the hoist during load limit positioning and to inhibit operation of the hoist in response to either of predetermined overspeed or predetermined underspeed of the hoist during subsequent operation of the hoist.

* * * * *